Patented Apr. 27, 1943

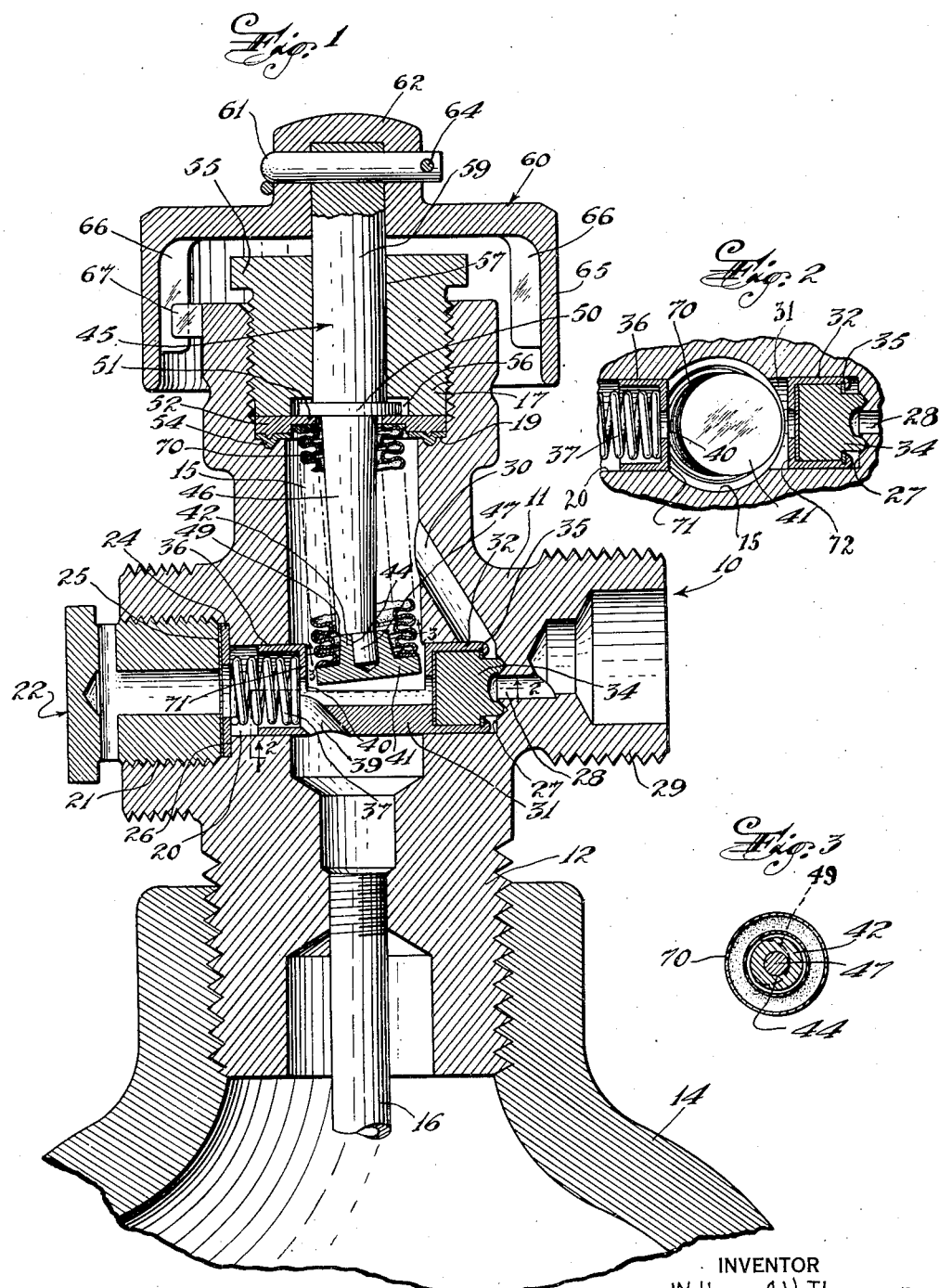

2,317,422

UNITED STATES PATENT OFFICE 2,317,422

VALVE

William A. V. Thomsen, Montclair, N. J., assignor to Specialties Development Corporation, Bloomfield, N. J., a corporation of New Jersey Application December 31, 1941, Serial No. 425,075

10 Claims. (Cl. 251—31)

The present invention relates to valves, and more particularly to a "packless" valve adapted to control the flow of a high pressure fluid medium.

A popular type of "packless" valve utilizes a flexible corrugated metallic sleeve or diaphragm, known as a "Sylphon" tube, for providing a seal between the valve stem or valve operating member and the valve casing. One of the difficulties encountered in connection with such valves, particularly where the valve stem or valve operating member has a tilting or pivotal movement, is that the flexible sleeve is subjected to severe or non-uniformly distributed bending strains. These strains ultimately cause breaks in the sleeve which destroy the effectiveness of the seal.

An object of the present invention is to overcome the foregoing difficulty.

Another object is to provide a "packless" valve wherein a flexible sleeve, or the like, forming a seal, is subjected to a flexing movement during the operation of the valve which is substantially natural thereto and which, therefore, results in a minimum of destructive strains.

Another object of the invention is to provide a valve of the foregoing character wherein the flexible sleeve is subjected to a minimum amount of localized stresses.

Another object is to provide a valve for the foregoing character wherein the flexible sleeve is movable in such a manner as to be capable of withstanding frequent distortion without impairment of the seal.

Another object is to provide a valve of the foregoing character which is simple, compact and rugged in construction; can be economically manufactured; and can be readily assembled.

Another object consists in the combination of elements and arrangements of parts, whereby the foregoing objects may be accomplished.

A further object is to provide a valve of the foregoing character which is particularly adapted for releasing a high pressure fluid medium from a cylinder, or the like, in which the medium may be stored.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is a longitudinal sectional view of a valve, illustrating an embodiment of the invention.

Figure 2 is a sectional view taken along the line 2—2 on Figure 1, illustrating a detail of the valve.

Figure 3 is a sectional view taken along the line 3—3 on Figure 1, illustrating another detail of the valve.

Referring to the drawing, there is shown a valve 10 having a casing or housing 11 provided at one end with a threaded plug portion 12 adapted to be secured in the neck of a container 14, such as a cylinder for storing compressed air, oxygen, nitrogen, carbon dioxide, hydrogen or other gases or fluid pressure media under relatively high pressure. The valve casing 11 has a longitudinal bore or chamber 15 therein, and a syphon tube 16, extending into the container 14, is attached to the casing adjacent the lower end of the bore. Adjacent the upper end of the bore or chamber 15, an enlarged threaded counterbore 17 and a shoulder 18 are provided for the purpose to be described hereinafter.

The valve casing is provided with a second bore 20 above the plug portion 12, which extends transversely through the casing and intersects the bore or chamber 15. One end of the bore 20 may have a threaded counterbore 21 for receiving an apertured plug 22 for holding a washer 24 and a safety sealing disc 25 on the seat 26 of the counterbore 21. The disc 25 is subjected to the pressure of the medium in the container 14 and is adapted to be ruptured when the pressure becomes dangerously high, whereby the medium may be vented to the atmosphere by way of the safety plug 22.

At the other end of the transversely extending bore 20, there is provided an annular valve seat 27 and an aperture 28 leading to an outlet nipple 29 for attaching a hose or pipe. A suitable passage 30 extends diagonally through the casing, from the chamber 15 to the bore 20, at a point adjacent the valve seat 27.

The bore 20 has a suitable valve means, such as a movable valve body 31, slidably mounted therein. One end of the valve body 31, preferably, has a cup-shaped portion 32 in which a sealing member 34 is mounted, adapted to seat on the valve seat 27 to shut off communication between the passage 30 and the aperture 28 leading to the outlet nipple 29. The sealing member may be formed of any suitable material and may be retained by an annular member 35, held in place by folding or bending inwardly the free edges of the cup-shaped portion. The other end of the valve body 31 also may be provided with a cup-shaped portion 36 for receiving one end of a resilient member, such as a cylindrical helical spring 37. The other end of the spring 37 abuts the washer 24, whereby the spring is adapted to urge the valve body toward the valve seat.

The portion of the valve body 31, intermediate the cup-shaped end portions 32 and 36, is provided with a passage 39 extending from the bore or chamber 15 to the cup-shaped portion 36 in which the spring 37 is positioned, so that the pressure medium in the container is in communication with the safety release disc 25. A suitable slot or recess 40 (Figure 2) is provided in the upper side of the middle portion of the valve body 31 for receiving means adapted to move the valve body away from and toward the valve seat 27.

The means for moving the valve body 31 may comprise a substantially disc-shaped shoe member 41 having a hub portion 42 provided with a centrally located aperture 44; and a valve stem or shank member 45 rotatably mounted, as about to be described, and having a depending portion 46 extending into the chamber 15. The portion 46 is provided at its end with an eccentrically located cylindrical stud or pin portion 47 fitted into the aperture 44 of the shoe member 41 (Figure 3) in a manner so as to permit rotary movement of the pin with respect to the shoe member. The stud portion 47 is inclined with respect to the longitudinal axis of the valve stem 45, and the free end 49 of the depending portion 46 is perpendicular to the longitudinal axis of the stud portion and engages the rim of the hub portion 42.

The valve stem may be rotatably mounted by providing it with a flange 50 above its depending portion 46, adapted to overlie the inwardly extending flange 51 of an annular flange member 52 seated on the shoulder 19 of the valve casing. A suitable annular sealing gasket 54 may be carried by the flange member 52 or may be positioned between the shoulder 19 and the flange member. If desired, the seat may have an annular groove and the underside of the flange member 52 may have a rib adapted to force the gasket 54 into the groove to form a secure seal when the flange member is secured.

The flange member 52 is held in place by a plug or bushing member 55 threadedly secured in the counterbore 17 of the casing. The bushing member 55 has a circular recess 56 on its underside for receiving the flange 50 of the valve stem and has a centrally located bore or aperture 57 for rotatably supporting the upper end 59 of the stem.

The upper end of the stem extends upwardly through the bushing member and has a suitable handwheel 60, or the like, attached thereto for effecting rotation of the stem. The handwheel 60 may be attached to the stem 45 in any suitable manner, for example, by a pin 61 extending through the upper end of the stem and a hub 62 on the handwheel, and held in place by a split spring ring 64. The handwheel may have a depending skirt or flange 65 extending about the upped end of the casing. Rotation of the handwheel may be restricted to a half turn in either a clockwise or counterclockwise direction, and an indication of the fully opened or fully closed position for the sealing member 34 can be obtained by a pair of diametrically opposite stops 66, extending inwardly from the flange 65 and adapted to abut a lug or projection 67, extending outwardly from the valve casing in the path of rotation of the stops.

In order to prevent leakage of pressure medium from the chamber 15 between the valve stem or valve operating member 45 and the bushing 55, without having to introduce a packing, the upper end of a suitable flexible and corrugated sleeve 70, such as a "Sylphon" tube, is soldered or otherwise secured in a leakproof manner to the underside of the flange 51 of the flange member 52, and the lower end of the sleeve is similarly secured to the upper surface of the disc-shaped shoe member 41. In this manner the pressure medium in the bore or chamber 15 is prevented from passing between stem portion 46 and the inner periphery of the flange 51 and into the recess 56, from where it would pass between the upper portion 59 of the stem and the bore 57 of the bushing.

The sleeve 70 also serves to support the shoe member 41 and prevents it from being separated from the stud or pin portion 47 when the parts of the valve are positioned in assembled relation in the valve housing or casing. The inclination of the stud portion 47, with respect to the longitudinal axis of the stem 46, is such that the sleeve 70, at all times, is curved to conform substantially to an arc of a circle of a predetermined and substantially constant radius. The degree of curvature of the arc is predetermined to conform to the natural flexing of the sleeve, so that the sleeve will be subjected to a minimum of destructive and localized stresses. The extent of inclination of the stud portion 47 with respect to the longitudinal axis of the stem 46 does not matter so much as the fact that a truly natural bending of the sleeve is achieved. Tests have indicated that the valve may be subjected to more than 30,000 opening and closing operations without any damage to the sleeve or its connecting seals at the flange 51 and the shoe member 41.

The stud portion 47, preferably, is cylindrical, as shown, to avoid any relative lateral movement between the sleeve 70 and the stem 46 during rotation of the latter. The movement of the shoe member 41 during rotation of the stem, is a nutating one, and the plane, in which the sleeve is curved, rotates about the longitudinal axis of the stem portion 46.

The valve embodying the present invention may be readily assembled by placing the valve body 31, carrying the closure or sealing member 34, in the transverse bore 20 with the slot or recess 40 facing upwardly in the longitudinal bore 15. The spring 37 may then be inserted into the cup portion 36 of the valve body, and the washer 24 and safety disc may be moved toward the seat 26 by screwing the safety plug 22 into the counterbore 21.

The shoe member 41 and the flange member 52, preferably, are soldered to the sleeve 70 to provide a unit which may be placed in the valve chamber 15, with the shoe member extending into the slot 40 of the valve body, and the flange member on the gasket 54, seated on the shoulder 19. The valve stem or operating member is then inserted into the sleeve, with the stud portion 47 fitting into the aperture of the shoe member, and the flange 50 seated on the flange 51. The bushing member 55 is then screwed into the counterbore 17 to hold the flange member 52 in place, and the handwheel is attached to the upper end of the valve stem.

In operation, the closure member 34 of the valve body 31 normally is urged toward and seated on the valve seat 27 by the action of the spring 37, while the shoe member 41 and its operating stem 45 are in the position shown in Figure 1. If the valve is attached to a cylinder or a supply line containing a pressure medium, the pressure medium enters into the chamber or bore 15 by way of its bottom opening, passes through the passage 39 to subject the safety disc 25 to its pressure, and passes upwardly through and around the valve body into the upper part of the chamber 15 and into passage 30.

When it is desired to release the pressure medium through the outlet passage 28, the handwheel is rotated about a half turn in the direction permitted by arrangement of the stops 66 and the projection 67. This causes the valve stem to rotate and move its stud portion 47 in a circular path to shift or move the shoe member into a position where it will engage the end face 71 of the slot 40 and slide the valve body away from the valve seat 27 in opposition to the spring 37, whereby the valve sealing or closure member 34 is moved away from the valve seat and pressure medium may flow from the passage 30 to the outlet passage 28. In order to stop the flow of the pressure medium, the handwheel is rotated to its initial position, whereby the shoe member releases the end face 71 of the slot 40 and permits the valve body to return to its initial position by means of the spring 37 or causes the valve body to be moved toward the valve seat by engaging the end face 72 at the opposite side of the slot 40 (Figure 2).

From the foregoing description it will be seen that the present invention provides an improved valve of the "packless" type which can be economically manufactured; readily assembled; and operated in a convenient manner. The valve is rugged in construction and can readily withstand the rough usage to which it may be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a valve of the class described, the combination of a casing having a shoulder therein, a valve member slidably mounted in said casing, a flange member mounted on said shoulder, a valve stem having a flange rotatably supported on said flange member and having a portion extending into said casing, means for maintaining said flange on said flange member and for maintaining said flange member on said shoulder, a member eccentrically connected to the portion of said valve stem extending into said casing for moving said valve member upon rotation of said valve stem, and a flexible corrugated sleeve enclosing said valve stem portion, one end of said sleeve being secured to said member for moving said valve member and the other end of said sleeve being secured to said flange member.

2. In a valve of the class described, the combination of a casing having a shoulder therein, a valve member slidably mounted in said casing, a flange member mounted on said shoulder, a valve stem having a flange rotatably supported on said flange member and having a portion below said flange extending into said casing, a bushing member secured to said casing for maintaining said flange member on said shoulder and having a recess for receiving said flange and an aperture for rotatably receiving the portion of said valve stem above said flange, a member eccentrically connected to the portion of said valve stem extending into said casing for moving said valve member upon rotation of said valve stem, and a flexible corrugated sleeve enclosing said valve stem portion, one end of said sleeve being secured to said member for moving said valve member and the other end of said sleeve being secured to said flange member.

3. In a valve of the class described, the combination of a casing having a valve seat, valve means slidably mounted in said casing, resilient means for urging said valve means toward said valve seat, a rotatable valve stem having a portion extending into said casing and having a portion extending out of said casing, an eccentrically positioned stud at the free end of said valve stem portion extending into said casing, a member having an aperture for receiving said stud and adapted to slidably move said valve means upon rotation of said valve stem, a flexible corrugated sleeve enclosing the portion of said valve stem extending into said casing, one end of said sleeve being secured to said member for moving said valve member and the other end of said sleeve being secured to said casing, and means for rotating said valve stem attached to said valve stem portion extending out of said casing.

4. In a valve of the class described, the combination of a casing having a shoulder therein, a flange member on said shoulder, a rotatable valve stem having a flange supported on said flange member and having a portion extending into said casing, a bushing having an aperture for rotatably mounting said valve stem and having a recess for receiving the flange of said stem, said bushing further serving to maintain said flange member on said shoulder, a valve member mounted for sliding movement in said casing, a shoe member eccentrically attached to the free end of said valve stem portion extending into said casing and adapted to engage and move said valve member upon rotation of said stem, and a flexible sleeve enclosing said valve stem portion in the casing, one end of said sleeve being secured to said shoe member and the other end of said sleeve being secured to said flange member.

5. In a valve of the class described, the combination of a casing having a valve port and a shoulder therein, a flange member on said shoulder, a rotatable valve stem having a flange supported on said flange member and having a portion extending into said casing terminating in an inclined eccentrically positioned stud portion, a bushing having an aperture for rotatably mounting said valve stem and having a recess for receiving the flange of said stem, said bushing further serving to maintain said flange member on said shoulder, a handwheel for rotating said valve stem, a valve member mounted for sliding movement in said casing to control said valve port, resilient means for urging said valve member towards said port, a shoe member rotatably attached to said stud portion at the free end of said valve stem portion extending into said casing and adapted to engage and move said valve member upon rotation of said stem, and a flexible sleeve enclosing said valve stem portion in the casing, one end of said sleeve being secured to said shoe member and the other end of said sleeve being secured to said flange member.

6. In a valve of the class described, the combination of a valve casing having a partition therein; a valve member slidably disposed in said valve casing; a rotatable valve stem extending through said partition into said valve casing; an eccentric at the inside end of said valve stem which has its axis inclined with respect to the axis of said valve stem; a shoe member connected to said eccentric in a manner to permit relative rotary movement between said shoe member and said valve stem, said shoe member, upon rotation of said valve stem, being adapted to move said valve member from one position to another; and a flexible sealing tube enclosing the portion of said valve stem extending into said casing, having one end thereof secured to said partition and having its other end secured to said shoe member.

7. In a valve of the class described, the combination of a valve casing having a partition therein; a valve member slidably disposed in said valve casing; a rotatable valve stem extending through said partition into said valve casing; an eccentric including a cylindrical stud at the inside end of said valve stem which has its axis inclined with respect to the axis of said valve stem; a shoe member connected to said stud in a manner to permit relative rotary movement between said shoe member and said valve stem, said shoe member, upon rotation of said valve stem, being adapted to move said valve member from one position to another; and a flexible sealing tube enclosing the portion of said valve stem extending into said casing, having one end thereof secured to said partition and having its other end secured to said shoe member.

8. In a valve of the class described, the combination of a valve casing having a partition therein, a valve member slidably disposed in said valve casing; a rotatable valve stem extending through said partition into said valve casing; an eccentric at the inside end of said valve stem, which has its axis inclined with respect to the axis of said valve stem; a shoe member connected to said eccentric in a manner to permit relative rotary movement between said shoe member and said valve stem, said shoe member, upon rotation of said valve stem, being adapted to move said valve member from one position to another; and a flexible sealing tube enclosing the portion of said valve stem extending into said casing and having one end thereof secured to said partition and having its other end secured to said shoe member, the length of said tube being at least substantially equal to the overall length of the portion of said valve stem extending into said valve casing through said partition and said eccentric.

9. In a valve of the class described, the combination of a valve casing having a partition therein; a valve member slidably disposed in said valve casing; a rotatable valve stem extending through said partition into said valve casing and having an inclined face at its inside end; an eccentric at the inside end of said valve stem which has its axis substantially perpendicular to the inclined face of said valve stem; a shoe member connected to said eccentric in a manner to permit relative rotary movement between said shoe member and said valve stem, said shoe member, upon rotation of said valve stem, being adapted to move said valve member from one position to another, said shoe member having a surface adapted to bear against the inclined end face of said valve stem; and a flexible sealing tube enclosing the portion of said valve stem extending into said casing, having one end thereof secured to said partition and having its other end secured to said shoe member.

10. In a valve of the class described, the combination of a casing, a valve member movably mounted in said casing having a slot therein, a rotatable valve stem having a portion extending into said casing provided with a portion at its free end which is eccentrically positioned and inclined with respect to said valve stem, a shoe member extending into the slot of said valve member and having an aperture for receiving said eccentric portion and adapted to move said valve member upon rotation of said valve stem, and a flexible sleeve enclosing the portion of said valve stem extending into said casing, one end of said sleeve being secured to said shoe member and the other end of said sleeve being attached to said casing.

WILLIAM A. V. THOMSEN.